Feb. 21, 1956  J. E. GROBL ET AL  2,735,211
SINKER RELEASE STRUCTURE
Filed May 25, 1953

JON E. GROBL
ROY J. RENHOLTS
INVENTORS

BY *Harper Allen*
ATTORNEY

United States Patent Office 2,735,211
Patented Feb. 21, 1956

2,735,211

SINKER RELEASE STRUCTURE

Jon E. Grobl and Roy J. Renholts, Oakland, Calif.

Application May 25, 1953, Serial No. 357,136

4 Claims. (Cl. 43—43.12)

The present invention relates to a sinker release of the type adapted to automatically release the sinker or weight when the fish takes a hook and tugs on the line.

It is a general object of the invention to provide a sinker release structure which can be set in open position to receive the sinker and then be readily set in its releasable sinker holding position.

Another object of the invention is to provide a sinker release structure of a simple construction which can be manufactured economically.

The above and other objects of the invention are attained as described in connection with certain preferred embodiments of the invention, as shown in the accompanying drawings, in which.

Figure 1:
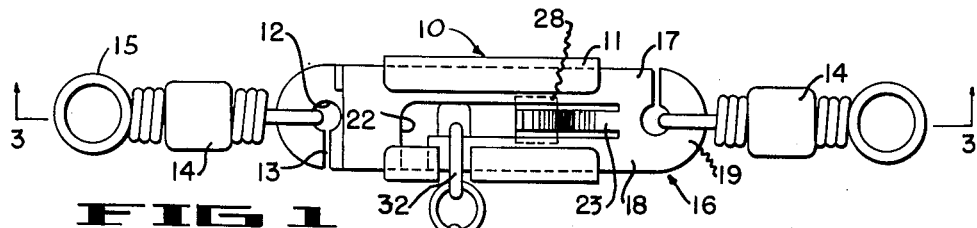
Figure 1 is an elevational view of the sinker release structure showing a sinker attached thereto.
Figure 2:
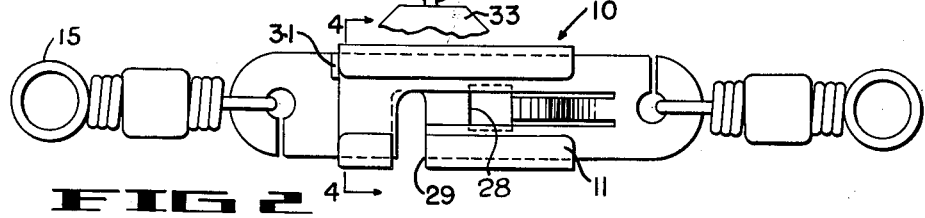
Figure 2 is a view similar to Figure 1, but showing the release in expanded or open position.
Figure 3:
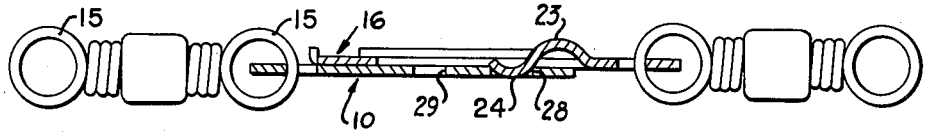
Figure 3 is a sectional view taken in a plane indicated by the line 3—3 in Figure 1.
Figure 4:
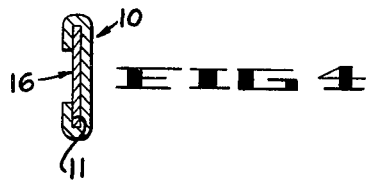
Figure 4 is a sectional view taken in a plane indicated by the line 4—4 in Figure 2.

In accordance with the instant invention, a sinker release structure is provided including parts capable of fabricating by punch press operation and of being easily assembled, and, subsequently, being easily adjusted to and from open position. As seen in Figures 1 and 2, the sinker release structure includes a main body member 10 of sheet metal, such as brass, and having respective opposed U-shaped guide-ways 11 formed at its side edges. An eye 12 is provided at one end and is connected by a slot 13 to the outer surface for attachment of a conventional swivel connection 14 having eyes 15 at its ends. The release structure also includes a slide member 16 of resilient sheet metal, such as beryllium copper, and having opposed side portions 17 and 18 disposed in the guide-ways 11. The member 16 is also provided with an eye portion 19 to receive an end loop of a conventional swivel connection 14 in the same manner as the eye 12. The member 16 is provided with an L-shaped slot 22 extending from the side edge 18 adjacent the left end thereof as viewed in Figure 1 and then longitudinally to the right. A latching tongue or latch element 23 of the slide member 16 is disposed in the slot and provided with a bent latching end 24. The end 24 of the member 16 is adapted for cooperation with a latch notch or station 28 in the member 10 so that the members 10 and 16 are latched in their collapsed position and are frictionally held by the latch element 23 in the open or extended position as shown in Figure 2. In this position a stop lug 31 is engaged with the end of the upper U-shaped guideway 11 to hold the parts from further extended movement.

In this position the end of the L-shaped opening 22 is an alignment with a slot 29 in the lower side of the member 10, so that a side opening is formed in the release structure as seen in Figure 2. With the release structure conditioned, a supporting eye 32 of a conventional sinker or weight 33 can be moved into the side opening in the release structure and when the parts are collapsed, the side portion 18 engages in the eye 32 as shown in Figure 1.

Overtravel movement of the members of the release structure in the direction of shortening is prevented by the eye 15 of the swivel connection 14 forming a stop for the member 16. It will be seen in Figure 1 that with the parts closed the side portion 18 of the member 16 extends across and closes the opening 29 in the member 10 so that a sinker 33 is held therein. However, upon tension being applied to the line due to a fish being caught on the hook, the parts are extended from the position shown in Figure 1 to that shown in Figure 2 so that the sinker is automatically released, and the desired play of the fish can be had without interference by virtue of the sinker's weight.

Figure 5:
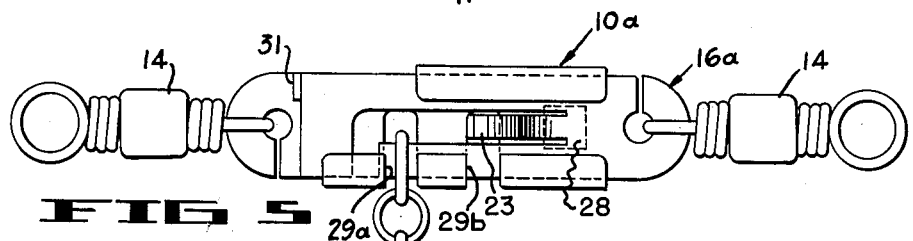
Figure 5 is a view similar to Figure 1, but showing a modified construction.
Figure 6:
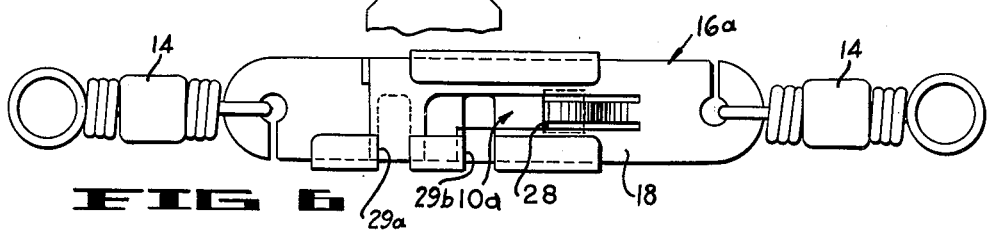
Figure 6 illustrates the open position of the release structure shown in Figure 5.

In the modification shown in Figures 5 and 6, a selective positioning of the sinker release structure is provided whereby the sinker can be held in either of two positions, one position requiring a greater pull to release the weight than the other. In this modification two slots 29a and 29b are provided in the member 10a and the spring tongue or latch element 23 is adapted to cooperate with the right-hand slot 29b in one position as shown in Figure 5, or with the opening 28 in the member 10a as shown in Figure 6. The opening 28 is formed wider than the slot 29b, to permit deeper seating of the latch element 23, and so require a greater pulling force for unseating of the latch element 23. Thus the fisherman can select the amount of pull for release of the weight so that it would not be released by a smaller fish, for example if he wishes to catch fish with a light pull, the part would be positioned as shown in Figure 5.

While we have shown and described a preferred embodiment of the invention, it is apparent that the invention is capable of variation and modification from the form shown so that the scope thereof should be limited only by the scope of the claims appended hereto.

We claim:

1. In a sinker release structure, a pair of telescopically engaged parts relatively movable between expanded and contracted positions, line securing means at the outer end of each part, one of said parts including a pair of opposed elongated guide-ways disposed along opposite edges thereof, one of said guide-ways having a notch therein to receive an eye of a sinker and the other of said parts comprising an elongated member engaged with said guide-ways and having a sinker retaining portion disposed adjacent to the notched guide-way and extending across said notch in the contracted position of the parts, said parts including means for releasably retaining said parts in either an expanded or contracted position, movement of the parts to the expanded position thereof serving to move said sinker retaining portion from alignment with said notch, whereby the sinker is released.

2. In a sinker release structure, a pair of telescopically engaged sheet metal parts relatively movable between expanded and contracted positions, line securing means at the outer end of each part, one of said parts including a pair of reversely turned edges forming opposed guide-ways, one of said guide-ways having a notch therein to receive an eye of a sinker, the other of said parts comprising an elongated member engaged with said guide-ways and having a sinker retaining portion disposed adjacent to the notched guide-way and extending across said notch in the contracted position of the parts, said one part including a latching station centrally disposed between said guide-ways and said other part having a centrally disposed formed resilient latching finger for engagement with said latching station, in the contracted position of the parts, movement of the parts to the expanded position thereof serving to move said sinker retaining portion from alignment with said notch, whereby the sinker is released.

3. A sinker release structure comprising two telescopically engaged parts, one of said parts having an element for supporting a sinker, the other of said parts having a pair of laterally disposed notches to selectively receive a supporting eye of a sinker and a latching station formed therein and spaced from one of said notches a distance equal to the spacing of said notches, and a resilient integral latch on said one part for selective engagement with said latching station and the adjacent notch in the sinker supporting positions of the parts in which said element is in overlapping relation with one or both of said notches, said latching station and said adjacent notch having different widths to provide for different amounts of engagement of said latch therein and to provide thereby selection of the amount of pull to release a sinker.

4. In a sinker release structure, a pair of telescopically engaged parts relatively movable between expanded and contracted positions, line securing means at the outer end of each part, one of said parts including a pair of opposed elongated guideways disposed along opposite edges thereof, one of said guide-ways having a pair of spaced notches therein to receive selectively an eye of a sinker, the other of said parts comprising an elongated member slidably engaged with said guide-ways and having a sinker retaining portion disposed adjacent to the notched guideway, said parts including means for releasably retaining said part in an expanded sinker releasing position or in either of two contracted sinker retaining positions, said retaining means including means for requiring different amounts of pull for sinker release at said respective sinker retaining positions, said sinker retaining portion extending across both of said notches in one contracted position of the parts and across only one of said notches in the other contracted position of the parts, movement of the parts to the expanded position thereof serving to move said sinker retaining portion from alignment with said notches.

References Cited in the file of this patent
UNITED STATES PATENTS

| | | |
|---|---|---|
| 1,033,464 | Pomeroy | July 23, 1912 |
| 2,322,536 | Miller | June 22, 1943 |